(12) United States Patent
Willins et al.

(10) Patent No.: US 8,265,895 B2
(45) Date of Patent: Sep. 11, 2012

(54) INTERACTIVE SENSOR SYSTEMS AND METHODS FOR DIMENSIONING

(75) Inventors: Bruce Willins, E. Northport, NY (US); Brian Viscount, Mt. Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 302 days.

(21) Appl. No.: 12/607,144

(22) Filed: Oct. 28, 2009

(65) Prior Publication Data
US 2010/0250183 A1    Sep. 30, 2010

Related U.S. Application Data

(60) Provisional application No. 61/164,042, filed on Mar. 27, 2009.

(51) Int. Cl.
*G06F 15/00*    (2006.01)
*G06K 9/00*    (2006.01)

(52) U.S. Cl. ......................... 702/150; 382/126
(58) Field of Classification Search .................. 702/150, 702/158; 382/103, 126; 250/234, 235
See application file for complete search history.

(56) References Cited

U.S. PATENT DOCUMENTS

| 4,149,417 A | 4/1979 | Griffiths et al. |
| 6,297,881 B1 | 10/2001 | Yahashi et al. |
| 2006/0201006 A1 | 9/2006 | Burlingham et al. |
| 2007/0038409 A1 | 2/2007 | Gilson et al. |
| 2007/0188323 A1* | 8/2007 | Sinclair et al. ............. 340/568.1 |
| 2008/0088817 A1 | 4/2008 | Skultety-Betz et al. |

FOREIGN PATENT DOCUMENTS

WO    2006124717    11/2006

OTHER PUBLICATIONS

International Search Report and Written Opinion dated Jun. 18, 2010 in related case PCT/US2010/027387.

* cited by examiner

*Primary Examiner* — Bryan Bui

(57) ABSTRACT

The present disclosure relates to interactive systems and methods for dimensioning with a mobile device. The mobile device can include an accelerometer, imager, and a corresponding algorithm configured to compute dimensions based on a plurality of inputs from the accelerometer, imager, etc. Specifically, the accelerometer allows the mobile device to measure acceleration and time, and the algorithm is configured to convert these measurements into distances. Additionally, with a three-axis accelerometer, the user can move the device off an axis being measured and still receive an accurate measurement, i.e. the algorithm can compensate for off-axis movement. Further, the present invention can incorporate an imager on the mobile device to provide additional compensation supplementing the algorithm and allowing the user additional freedom to be positioned away from the starting and end-point of a measurement.

18 Claims, 10 Drawing Sheets

INTERACTIVE SENSOR SYSTEMS AND METHODS FOR DIMENSIONING

CROSS-REFERENCE TO RELATED APPLICATION(S)

The present non-provisional patent application claims priority to U.S. Provisional Patent Application Ser. No. 61/164,042, filed Mar. 27, 2009 and entitled "INTERACTIVE SENSOR TECHNOLOGY FOR DIMENSIONING," which is incorporated in full by reference herein.

FIELD OF THE INVENTION

The present disclosure relates to mobile devices with sensor technology, and more particularly to interactive systems and methods for dimensioning with a mobile device.

BACKGROUND OF THE INVENTION

Increasingly mobile devices, such as smart phones, personal digital assistants (PDAs), music players, video game devices, bar code scanners, and other mobile electronic devices, are integrating multi-axis accelerometers to detect motion and integrated imaging devices to take pictures, video, etc. Such sensors are being used for applications such as gaming, screen rotation, and power management. Further, dimensioning has been a longstanding problem for workers. It is often the case where a worker carries both a ruler (e.g. tape measure) and a mobile electronic device. Since only one device can be used at a time for taking measurements, entering measurement data can be a very tedious and time consuming process. Accordingly, there is a need for improved methods, systems, and apparatus for dimensioning.

BRIEF SUMMARY OF THE INVENTION

In an exemplary embodiment of the present invention, a measuring method by a user of a device includes aligning a device to a first point, wherein the device includes a sensor; activating measurement in the device; moving the device to align the device to a second point; deactivating the measurement in the device; receiving a distance from the device based on sensor data, wherein the distance is a distance between the first point and the second point on an axis. The device further includes an imager, and wherein the aligning the device to the first point includes aligning an aiming pattern in the imager to the first point. The distance is further based on the sensor data plus offsets from the imager to remove sensor data from any movement off of the axis. The imager is configured to detect reference points and compute device orientation based on movement of the reference points. The measuring method further includes activating a timer responsive to activating the measurement; deactivating the timer responsive to deactivating the measurement; and utilizing a time from the timer with the sensor data to compute the distance. The measuring method further includes activating an imager responsive to activating the measurement; monitoring offsets from the axis through the imager as the device is moved; and removing the offsets from the sensor data. The removing the offsets includes analyzing symmetry of a pattern in the imager as the device moves and analyzing distortions of the pattern as the device moves.

In another exemplary embodiment of the present invention, a measuring method by a device includes providing an aiming pattern on a first point; activating a timer; gathering sensor data from an accelerometer as the device is in motion; providing the aiming pattern on a second point; and computing distance on an axis from the first point to the second point based on a time from the timer and the sensor data from the accelerometer. The device further includes an imager, and wherein the aiming pattern is provided on the first point through the imager. The distance is further based on the sensor data plus offsets from the imager to remove sensor data from any movement off of the axis. The imager is configured to detect reference points and compute device orientation based on movement of the reference points. The measuring method further includes activating an imager responsive to activating the timer; monitoring offsets from the axis through the imager as the device is moved; and removing the offsets from the sensor data. The removing the offsets includes analyzing symmetry of a pattern in the imager as the device moves and analyzing distortions of the pattern as the device moves.

In yet another exemplary embodiment of the present invention, a device includes a display; an input mechanism; an accelerometer; a processor; a local interface communicatively coupling the display, the input mechanism, the accelerometer, and the processor; wherein the accelerometer is configured to provide acceleration data to the processor for a plurality of axes; and wherein the processor is configured to compute a measurement based on user input, a timer, and the acceleration data. The display includes a user interface configured to interact with a user for performing measurements. The user input includes an activation and deactivation of a measurement, and wherein the activation and deactivation sets the timer to provide a time utilized to calculate the measurement with the acceleration data. The device further includes an imager, wherein the processor is further configured to receive image frames from the imager and to compute relative movement between each of the image frames thereby determining an orientation of the device. The orientation is utilized by the processor to remove any acceleration data not on a measurement axis. The processor is further configured to analyze symmetry of a pattern in the imager as the device moves and analyze distortions of the pattern as the device moves, and wherein the symmetry and the distortions are utilized by the processor to correct offsets associated with the device.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to interactive systems and methods for dimensioning with a mobile device. The mobile device can include an accelerometer, imager, and a corresponding algorithm configured to compute dimensions based on a plurality of inputs from the accelerometer, imager, etc. The present invention includes a user interface for the mobile device with associated commands, buttons, displays, etc. enabling a user to utilize the mobile device to perform measurements. Specifically, the accelerometer allows the mobile device to measure acceleration and time, and the algorithm is configured to convert these measurements into distances. Additionally, with a three-axis accelerometer, the user can move the device off an axis being measured and still receive an accurate measurement, i.e. the algorithm can compensate for off-axis movement. Further the present invention incorporates an imager which can include a projected aiming reticule which can be used targeting barcodes or documents in addition to improving measurement accuracy when used with the accelerometers allowing the user additional freedom to be positioned away from the starting and end-point of a measurement.

In an exemplary embodiment of the present invention, accelerometers are used in conjunction with an imaging device. For example, in one embodiment, the mobile device includes one or more integrated imagers (e.g., cameras). In this embodiment, the user instead of holding the device at the edge of the box, the device can be held at some nominal distance from the box. In one embodiment, once a button of the device is pressed, a timer is started, the sensors are activated and an imager is activated. The mobile device processes the image which can have in its field of view the starting corner of the box representing the starting point of the measurement. The user can them move the mobile device along the edge maintaining the edge within the field of view of the imager. Once the user views the end corner of the box in the displayed image (presented on the terminal display), the user releases the button. The relative position of the start and end corners within the image is used to adjust/compensate the starting and endpoints. The mobile device analyzes the image, finds the end corner and then calibrates out any off axis movement. In one embodiment where the box is symmetrical, the corner image may be used to determine if the user's hand has moved closer or further from the box. Furthermore, accelerometers can also be used to determine if the user has moved closer or further from the box and compensate accordingly.

Figure 1:
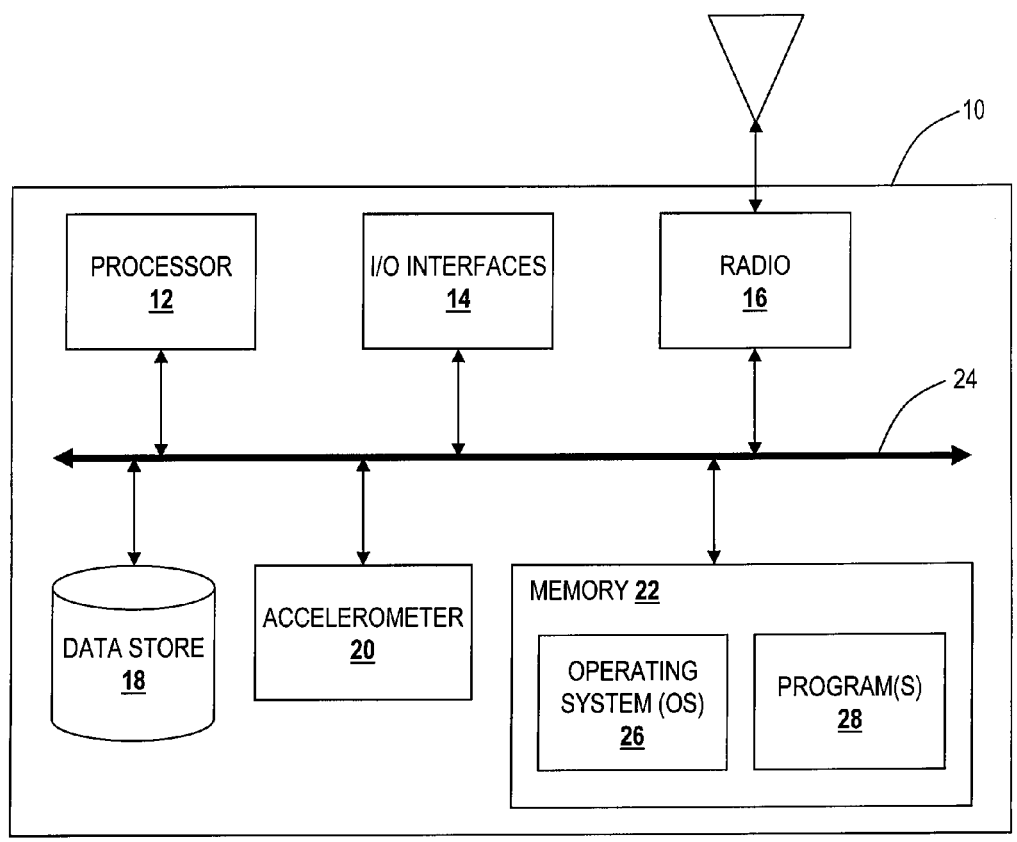
FIG. 1 is a representation of a mobile device used for dimensioning according to an exemplary embodiment of the present invention.

Referring to FIG. 1, in an exemplary embodiment, the present invention includes a mobile device 10 with various components configured for dimensioning of external objects. The mobile device 10 can be a digital device that, in terms of hardware architecture, generally includes a processor 12, input/output (I/O) interfaces 14, a radio 16, a data store 18, an accelerometer 20, and memory 22. It should be appreciated by those of ordinary skill in the art that FIG. 1 depicts the mobile device 10 in an oversimplified manner, and a practical embodiment may include additional components and suitably configured processing logic to support known or conventional operating features that are not described in detail herein. The components (12, 14, 16, 18, 20, and 22) are communicatively coupled via a local interface 24. The local interface 24 can be, for example but not limited to, one or more buses or other wired or wireless connections, as is known in the art. The local interface 24 can have additional elements, which are omitted for simplicity, such as controllers, buffers (caches), drivers, repeaters, and receivers, among many others, to enable communications. Further, the local interface 24 can include address, control, and/or data connections to enable appropriate communications among the aforementioned components.

The processor 12 is a hardware device for executing software instructions. The processor 12 can be any custom made or commercially available processor, a central processing unit (CPU), an auxiliary processor among several processors associated with the mobile device 10, a semiconductor-based microprocessor (in the form of a microchip or chip set), or generally any device for executing software instructions. When the mobile device 10 is in operation, the processor 12 is configured to execute software stored within the memory 22, to communicate data to and from the memory 22, and to generally control operations of the mobile device 10 pursuant to the software instructions.

The I/O interfaces 14 can be used to receive user input from and/or for providing system output to one or more devices or components. User input can be provided via, for example, a keyboard, a keypad, a mouse, a scroll bar, buttons, bar code scanner, and the like. System output can be provided via a display device such as a liquid crystal display (LCD), touch screen, and the like. The I/O interfaces 14 can also include, for example, a serial port, a parallel port, a small computer system interface (SCSI), an infrared (IR) interface, a radio frequency (RF) interface, and/or a universal serial bus (USB) interface. The I/O interfaces 14 can include a graphical user interface (GUI) that enables a user to interact with the mobile device 10. For example, the present invention can include a dimensioning GUI that the user can interact with to perform measurements using the device 10. Additionally, the I/O interfaces 14 can further include an imaging device, i.e. camera, video camera, etc., referred to herein collectively as an imager. The imager is configured to provide pictures and/or video to the device 10 from a camera lens disposed in the device 10. In an exemplary embodiment, an aiming pattern (reticule) is projected onto an object in the field of view of the imager. Alternatively, the I/O interfaces 14 can include a pointing device (e.g., laser, etc.) that is positioned along with the imager on an object for dimensioning.

The radio 16 enables wireless communication to an external access device or network. Any number of suitable wireless data communication protocols, techniques, or methodologies can be supported by the radio 16, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. The data store 18 can be used to store data. The data store 18 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 18 can incorporate electronic, magnetic, optical, and/or other types of storage media.

The memory 22 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 22 may incorporate electronic, magnetic, optical, and/or other types of storage media. Note that the memory 22 can have a distributed architecture, where various components are situated remotely from one another, but can be accessed by the processor 12. The software in memory 22 can include one or more software programs, each of which includes an ordered listing of executable instructions for implementing logical functions. In the example of FIG. 1, the software in the memory system 22 includes a suitable operating system (O/S) 26 and programs 28. The operating system 26 essentially controls the execution of other computer programs, and provides scheduling, input-output control, file and data management, memory management, and communication control and related services. The operating system 26 can be any of LINUX (or another UNIX variant), Android (available from Google), Symbian OS, Microsoft Windows CE, iPhone OS (available from Apple, Inc.), Palm OS, Blackberry OS, and the like. The programs 28 can include a program configured to interact with the accelerometer 20 to determine dimensioning as described herein.

The mobile device 10 further includes the accelerometer 20 as a multi-axis device configured to detect motion of the mobile device 10. Typically, the accelerometer 20 is utilized for applications such as gaming, screen rotation (e.g., switching between portrait and landscape modes positioning of the mobile device 10), image stabilization, and power management. The accelerometer 20 is configured to detect acceleration along a plurality of axes. The accelerometer 20 is an electrical device connected to the local interface 24, and can include any implementation, such as a sensor, a micromachined device, a spring mass device, a servo device, a strain gauge, a resonance device, a laser device, a surface acoustic wave device, and the like. As described herein, the accelerometer 20 includes one or more motion sensors which can be configured to provide dimensioning in conjunction with the imager, a measurement GUI, and the dimensioning algorithm.

The programs 28 can include the dimensioning algorithm that interacts with the imager in the I/O interfaces 14 and the accelerometer 20 to compute dimension. The programs 28 can also include the measurement GUI for interacting with a user and the dimensioning algorithm. This GUI can include buttons, commands, etc. along with instructions on how to utilize the mobile device 10 to perform a measurement. Specifically, the GUI can instruct the user how to position the device 10, how to manipulate or move the device 10, and what buttons, commands, etc. to activate throughout the process. Also, the dimensioning algorithm is configured to receive inputs from the I/O interfaces 14 and the accelerometer 20, and to compute an accurate measurement based on these inputs and associated offsets as described herein.

Figure 2:
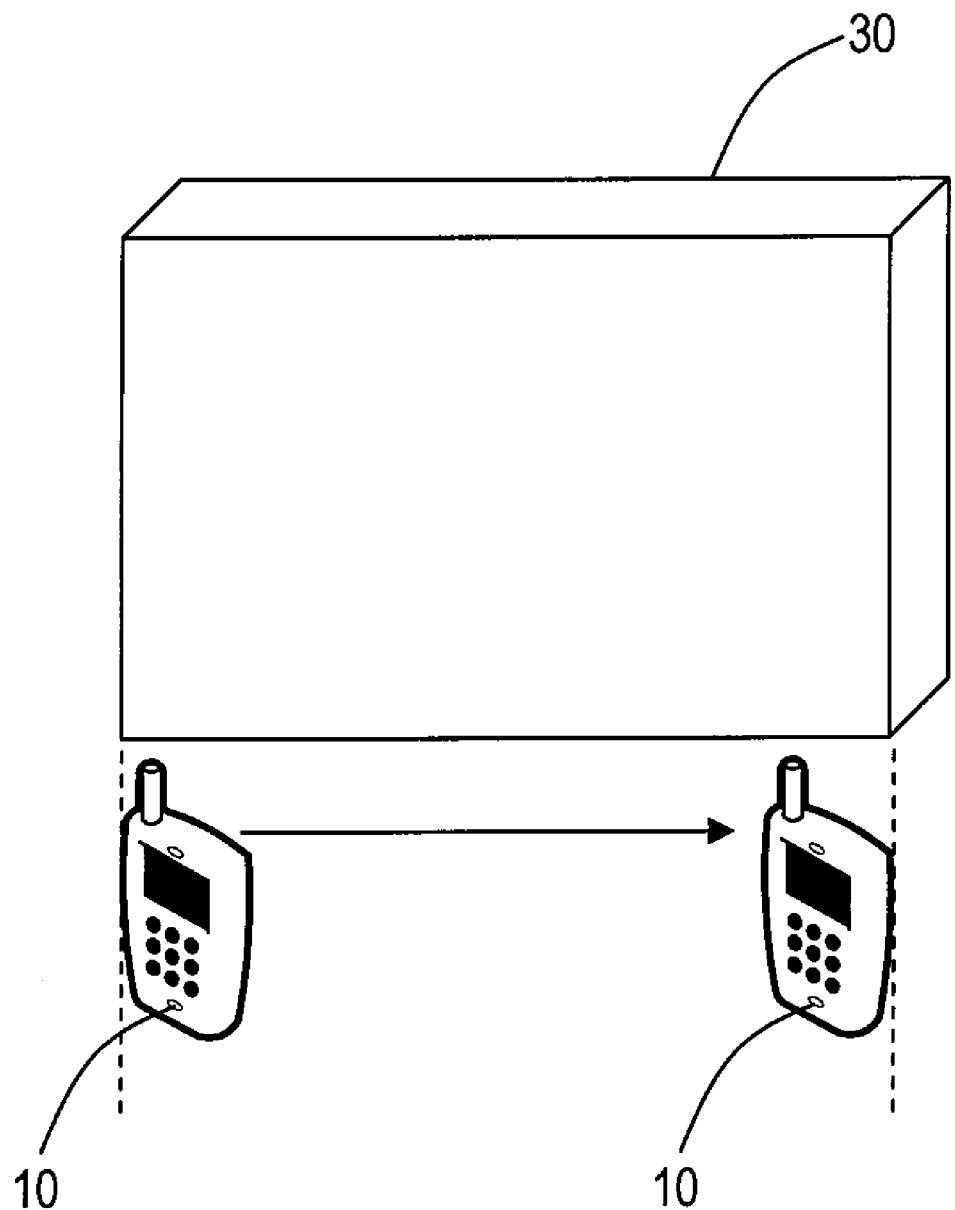
FIG. 2 is another representation of the mobile device used for dimensioning according to an exemplary embodiment of the present invention.

Referring to FIG. 2, in an exemplary embodiment, the present invention uses the accelerometer 20 with one or more motion sensors within the mobile device 10 for dimensioning. The mobile device 10 is typically carried by an individual or worker primarily as a means of communication, e.g. mobile phone. Also, there are often needs to performing measurements, i.e. dimensioning, of a variety of objects, places, etc. For example, parcel delivery applications can require dimensioning of boxes, such as a box 30. Using the present invention, the user places the mobile device 10 at one edge of the box 30. Holding the mobile device 10 relatively still, the user can depress a button (or other activation mechanism) on the mobile device 10 which activates a timer and the motion sensors (used as reference datum). The user can then move the device 10 to the other edge of the box 30 (potentially aligning the edge of the terminal to the edge of the box in a manner that was prescribed to the user and is compensated for in the actual calculation of the measurement).

Figure 3:
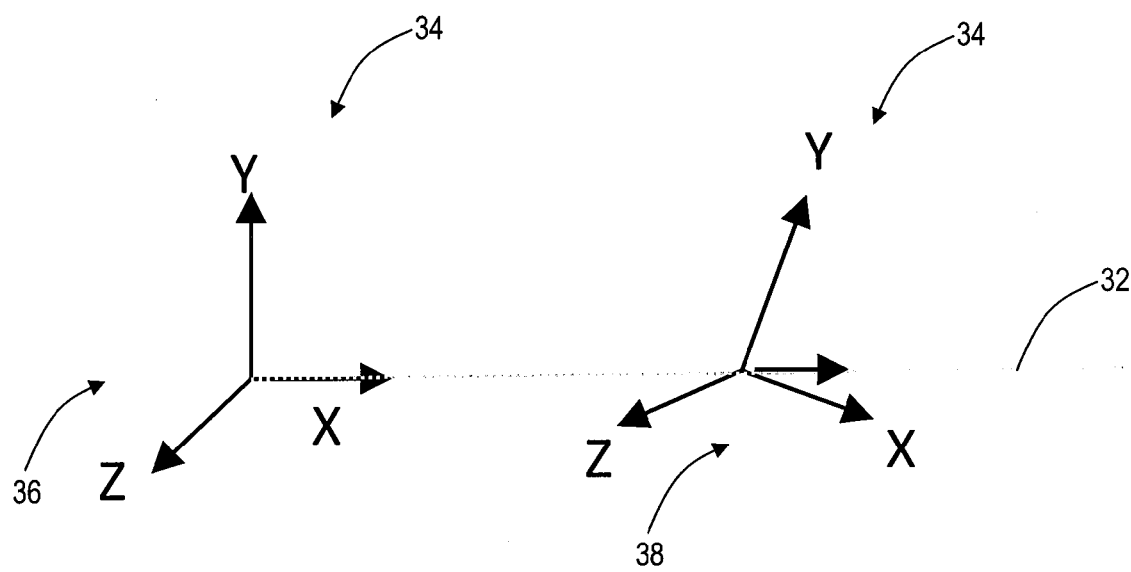
FIG. 3 is graphical representation of an XYZ coordinate system showing on-axis and off-axis movement according to an exemplary embodiment of the present invention.

Once the user has reached a remote end, the user can release the button (or other activation mechanism). The mobile device 10 then processes the time and acceleration data to determine distance. In one embodiment, the sensors are capable of measuring motion in three (3) dimensions. However, off-axis movement in roll, pitch, and or yaw can cause errors. Referring to FIG. 3, in an exemplary embodiment, movement of the mobile device 10 is illustrated along an axis 32 in an XYZ coordinate system 34 where the X-Axis represents left-right motion, the Y-Axis represent up-down motion, and the Z-Axis represents front-back motion (in-out of the page).

To show offsets produced by rolling of the device 10, reference to XYZ coordinate system 34, assume that the user is attempting to measure distance on the X-Axis. If the X-Axis accelerometer of the device 10 is aligned, as illustrated in an operation 36, and the device 10 moves without perturbation on the axis 32 the motion can be readily measured. If the device rolls (pivot point directly through centrum of accelerometer), as illustrated in an operation 38, then acceleration is detected from the roll and movement of the device 10 along the desired axis and there are now acceleration vectors created in both the X and Y axes. Algorithmically the device 10 cannot discriminate this motion from the scenario where the device 10 is on axis and the user is moving off-axis (e.g., up and to the right).

Figure 4:
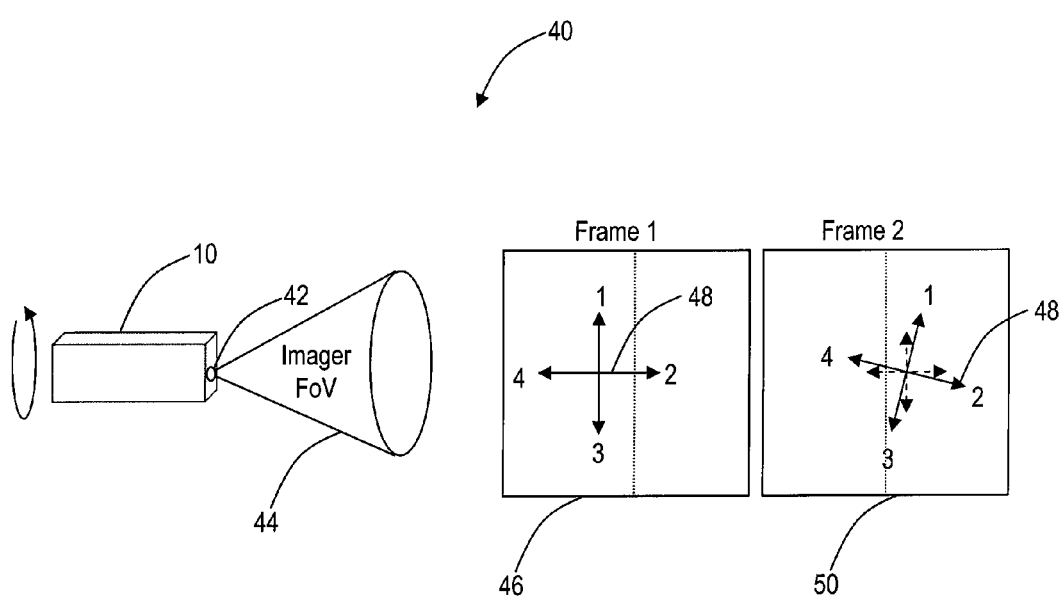
FIG. 4 is a diagram of the mobile device's imager used with an aiming pattern to provide measurement compensation according to an exemplary embodiment of the present invention.

Referring to FIG. 4, in an exemplary embodiment, to compensate for device 10 movements, the present invention can use an imager and/or the imager with an aiming pattern. As described in FIG. 1, the mobile device 10 can include the imager as part of the I/O interfaces 14. For dimensioning, the imager is utilized by the present invention to monitor offsets associated with the device 10 such that movement off-axis can be accounted for in dimensioning. FIG. 4 illustrates an exemplary operation 40 where the mobile device 10 includes an imager 42 to monitor the mobile device 10 during dimensioning. The imager includes a field of view (FoV) 44 that can be utilized to capture an image (shown in exemplary frames 1 and 2 in FIG. 4).

Upon activation of the mobile device 10 for dimensioning, the imager 42 can tag arbitrary patterns within the image FoV 44 or arbitrary patterns against an aiming reticule or pattern. These images are continually monitored by the device 10 for roll offset as the user moves the device 10. For example, a first frame 46 from the image can provide initial reference points 48. As there is roll associated with the device 10, a second frame 50 can monitor the roll based on the positioning of the reference points 48 in the FoV 44. The mobile device 10 can compute the associated offsets based on the differences in the reference points 48. These offsets can be utilized to remove the offsets from the measurement. For example, assume a measurement was performed by the device 10 and in performing the measurement, the user rolled the device thereby causing acceleration vectors to be measured in both the X and Y directions by the accelerometer 20. If the measurement is solely along the X direction, the device 10 can utilize the imager 42 to determine how much and when the roll occurred such that the Y acceleration vectors can be canceled out of the measurement.

Figure 5:
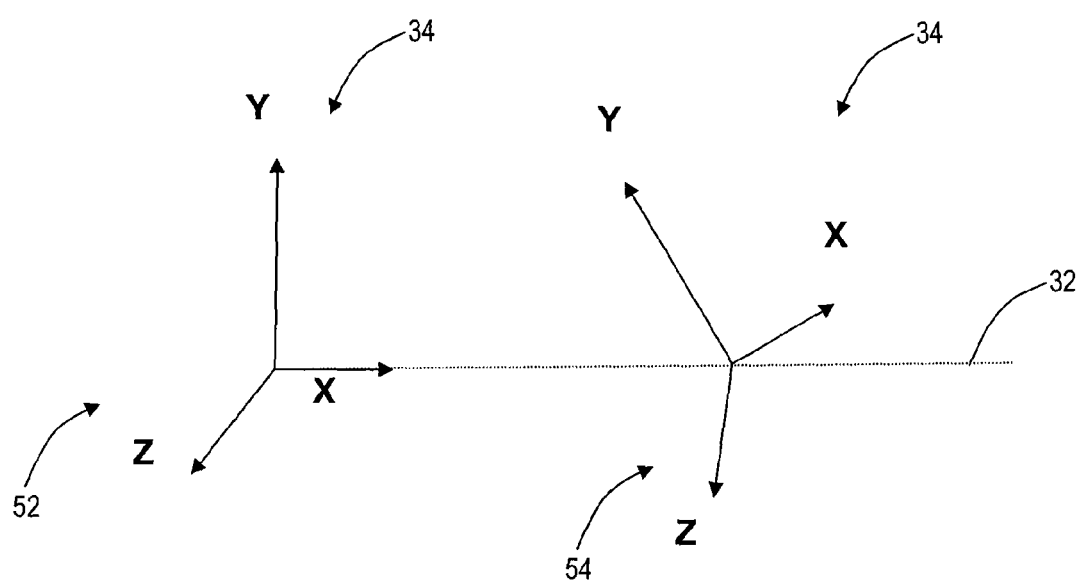
FIG. 5 is another graphical representation of an XYZ coordinate systems showing offset yaw movement according to an exemplary embodiment of the present invention.

Referring to FIG. 5, similarly to roll, offsets in yaw can cause Z-axis error components when measuring dimensions on the Y-Axis. FIG. 5 illustrates movement of the mobile device 10 along an axis 32 in an XYZ coordinate system 34. If the X-Axis accelerometer of the device 10 is aligned, as illustrated in an operation 52, and the device 10 moves without perturbation on the axis 32 the motion can be readily measured. If the device 10 pivots, as illustrated in an operation 54, then acceleration is detected from the pivot and movement of the device 10 along the desired axis and there are now acceleration vectors created in both the Y and Z axes.

Figure 6:
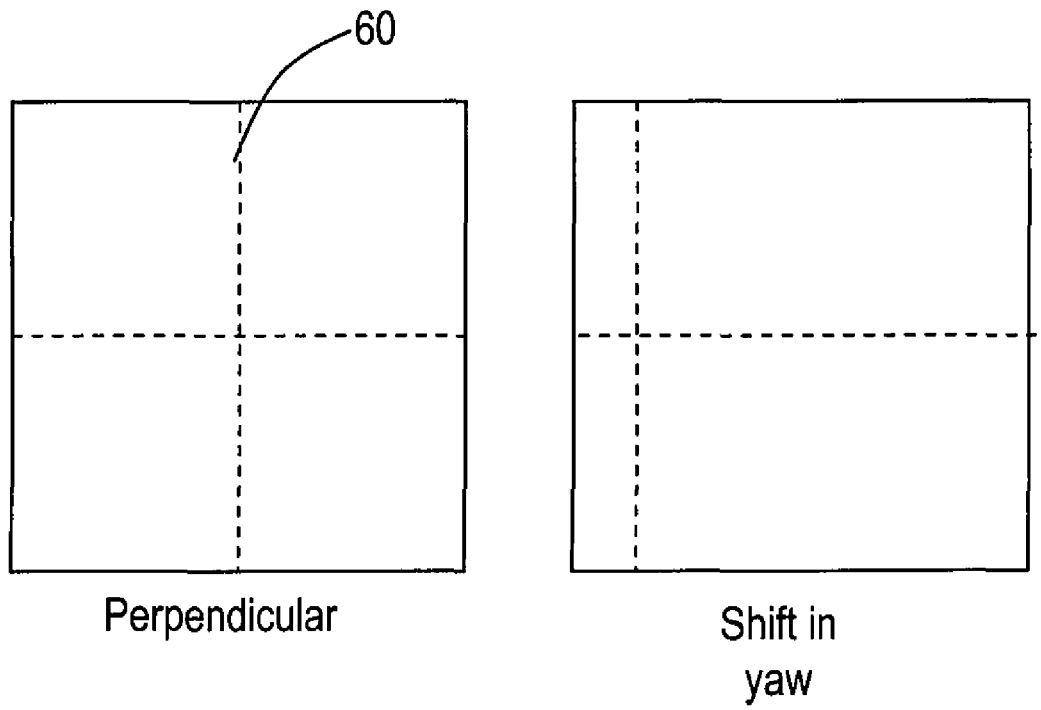
FIG. 6 is a diagram of an aiming pattern associated with the imager according to an exemplary embodiment of the present invention.

Referring to FIG. 6, in an exemplary embodiment, to compensate for changes in yaw, the mobile device 10 uses deformities in an aiming pattern image 60. For example assuming that a simple cross is used (commonly the case) as the aiming pattern 60, it is possible to determine offsets in yaw by looking at the symmetry of the pattern within the image. The aiming pattern is a two-dimensional pattern designed to promote detection of angular offsets when imaged, while continuing to enable targeting of objects for dimensioning, bar codes, and documents. Though offsets in pitch will have no impact on X-Axis measurements they have a similar Z-Axis error effect when measuring (e.g., height) dimensions in the Y-axis (i.e., can produce anomalous Z vector components). In the case of pitch, distortions in the aiming pattern (and/or other arbitrary patterns) can be used to detect both initial angular offsets and angular offsets during movement.

Figure 7:
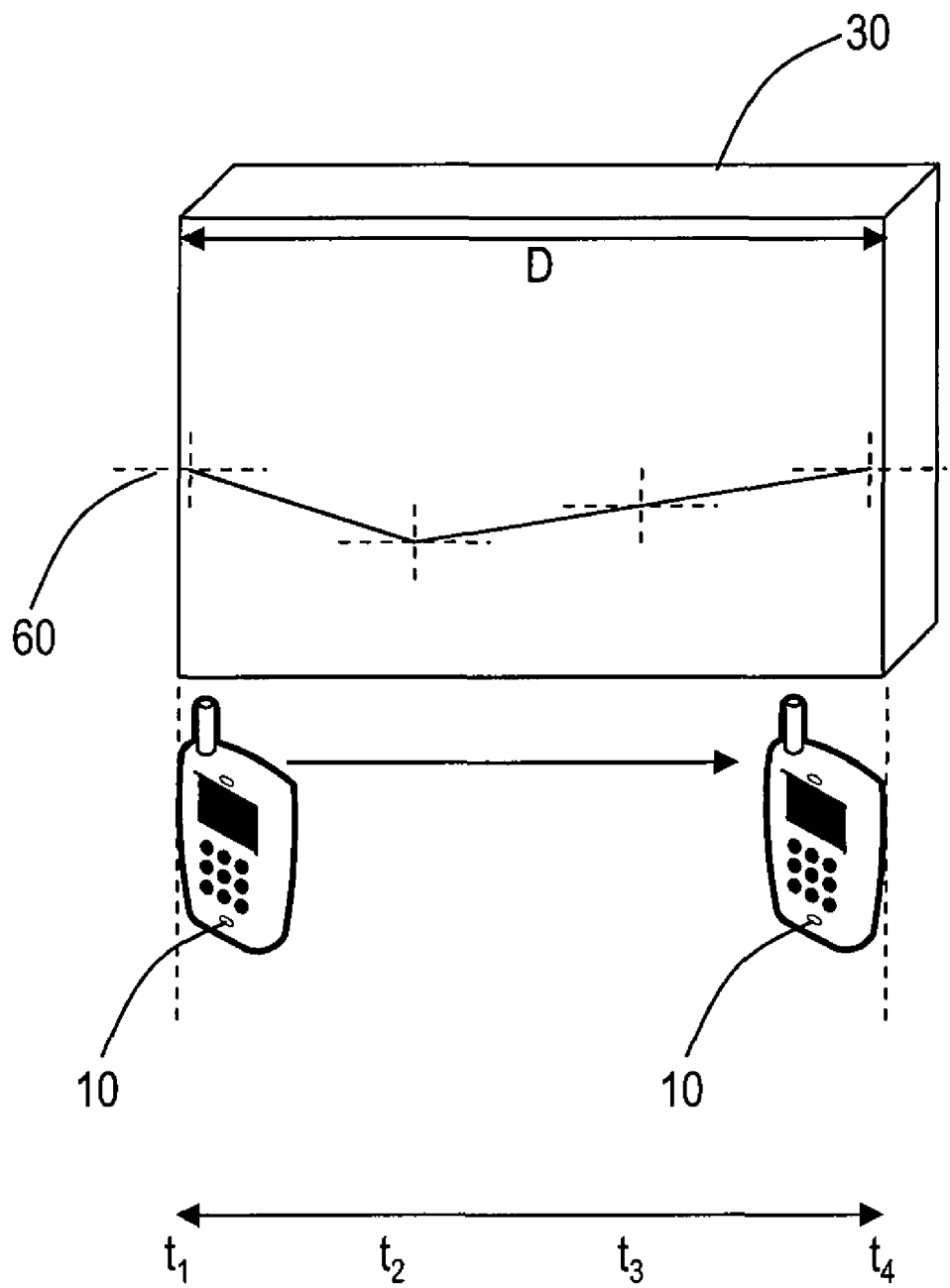
FIG. 7 is a diagram of a measurement operation using the mobile device for dimensioning according to an exemplary embodiment of the present invention.

Referring to FIG. 7, in an exemplary embodiment, the present invention uses the accelerometer 20 with one or more motion sensors along with an imager within the mobile device 10 for dimensioning. As described herein, the mobile device 10 includes compensation techniques to improve the usage model. Specifically, the user does not need to position the device 10 exactly at the device edge and does not need to worry about keeping the device absolutely still while dimensioning, i.e. moving the device. Also, in the present invention, the user may move the device 10 away from the item (e.g., the box 30) being dimensioned.

In this ideal modality, the user holds the device 10 at some nominal distance from the box 30. In one exemplary scenario, an aiming pattern 60 is enabled first. The user aligns the aiming pattern 60 to an edge of the box 30 (at time $t_1$). For example, the aiming pattern 60 can include a laser, etc. projected on the box 30 or a view of the box 30 in a display screen associated with the device 10 with the aiming pattern 60 displayed in the display screen. For example, the display screen can show the box 30 and a cross-hair (or the like) can be overlaid in the display screen with the user aligning the cross-hair to an edge of the box 30 in the display screen. Once aligned, the user activates the dimensioning (e.g., releasing a button, a double click, activating a touch screen, etc.). At this stage, the sensors, imager, and aimer in the device 10 are all activated. To dimension the box 30, the user slides the device 10 such that the aiming pattern 60 aligns to the far side of the box. In this example, the user moves the device with offsets that are illustrated at various points $t_2$, $t_3$, and $t_4$ as the aiming pattern 60 varies on the box 30. As the device 10 is moved along the box 30, the aiming pattern 60 is continually analyzed along with sensor data from an accelerometer. At point $t_4$, the user can designate an end point of the box 30. Here, the dimensioning is halted, and data from the imager and accelerometer is utilized by a dimensioning algorithm. Using the accelerometers and compensating for offsets with the aiming pattern 60, the dimension, D, of the box 30 can be computed.

It should be also noted that if the device 10 is pulled back from the box 30 during the dimensioning, this too can be detected by noting the difference in the size of the reticule vis-à-vis the size of the box 30 within the image (assuming that the aiming pattern 60 has some angular dispersion relative to the FoV of the imaging optics, its projection on the box 30 would grow as the device 10 moves further away). This should not directly impact the measurement calculation but may impact the processing of the aiming distortion.

Figure 8:
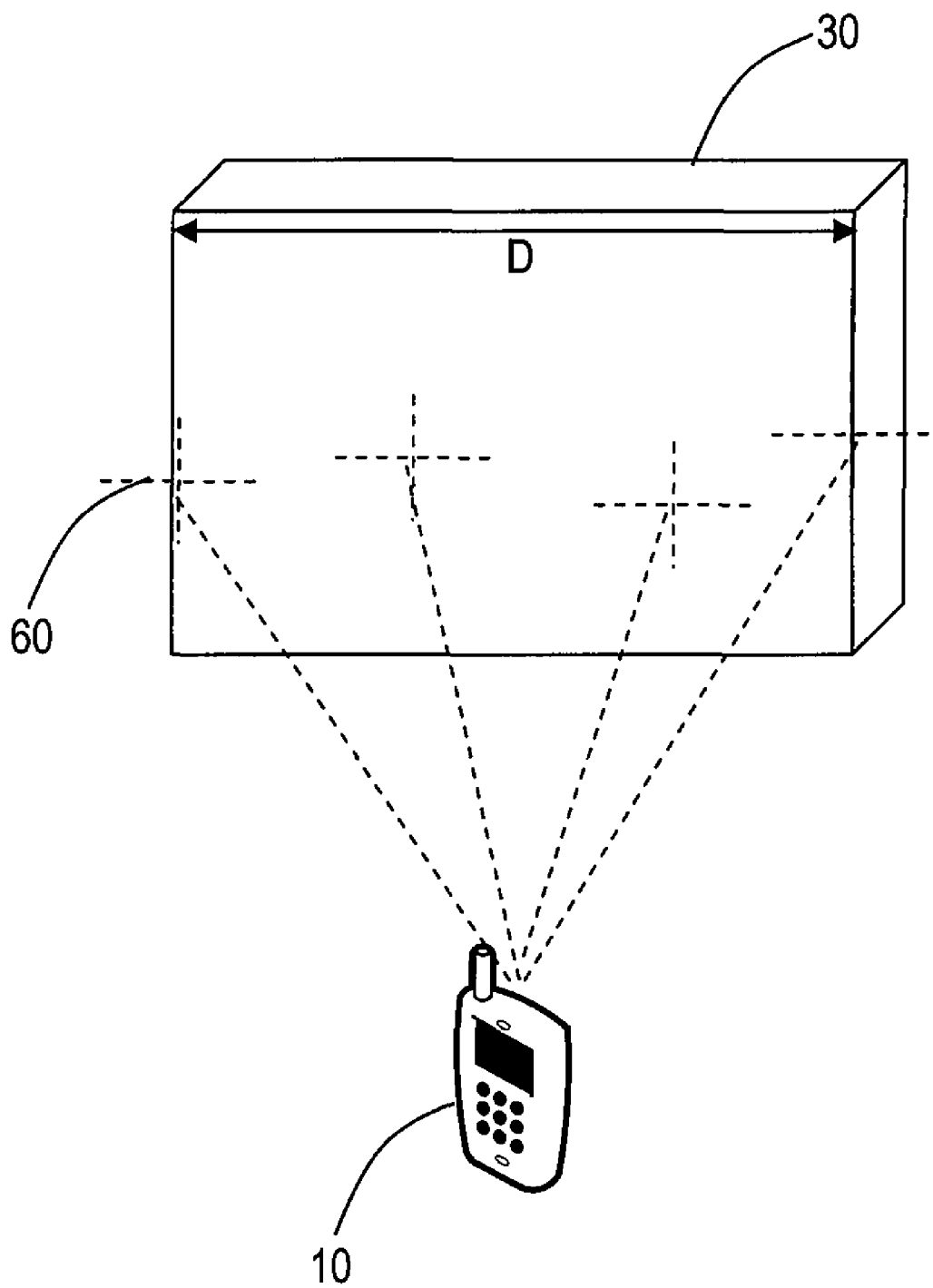
FIG. 8 is a diagram of another measurement operation using the mobile device for dimensioning according to an exemplary embodiment of the present invention.

Referring to FIG. 8, in another exemplary embodiment, the mobile device 10 can be held relatively stationary and an aiming pattern 60 can be moved to perform dimensioning. The accelerometer 60 can also be used in conjunction with other methods of dimensioning. For example, in FIG. 8, dimensions can be taken using an activation mechanism with the accelerometer 60 measuring an arc subtended by the device 10 in conjunction with a laser pointer and the imager. Advantageously, this can be done either at a distance or in close proximity similar to an imaging mouse. For example, here, the mobile device 10 can display the aiming pattern 60 on the box 30 or as an overlaid graphic in the display of the device 10. The user can move the device 10 in an angular fashion, i.e. creating a subtended arc, such that the aiming pattern 60 extends from a start point to an end point to be measured. The device 10 can take into account acceleration, the position of the aiming pattern relative to the imager, and time to compute the measurement.

Figure 9:
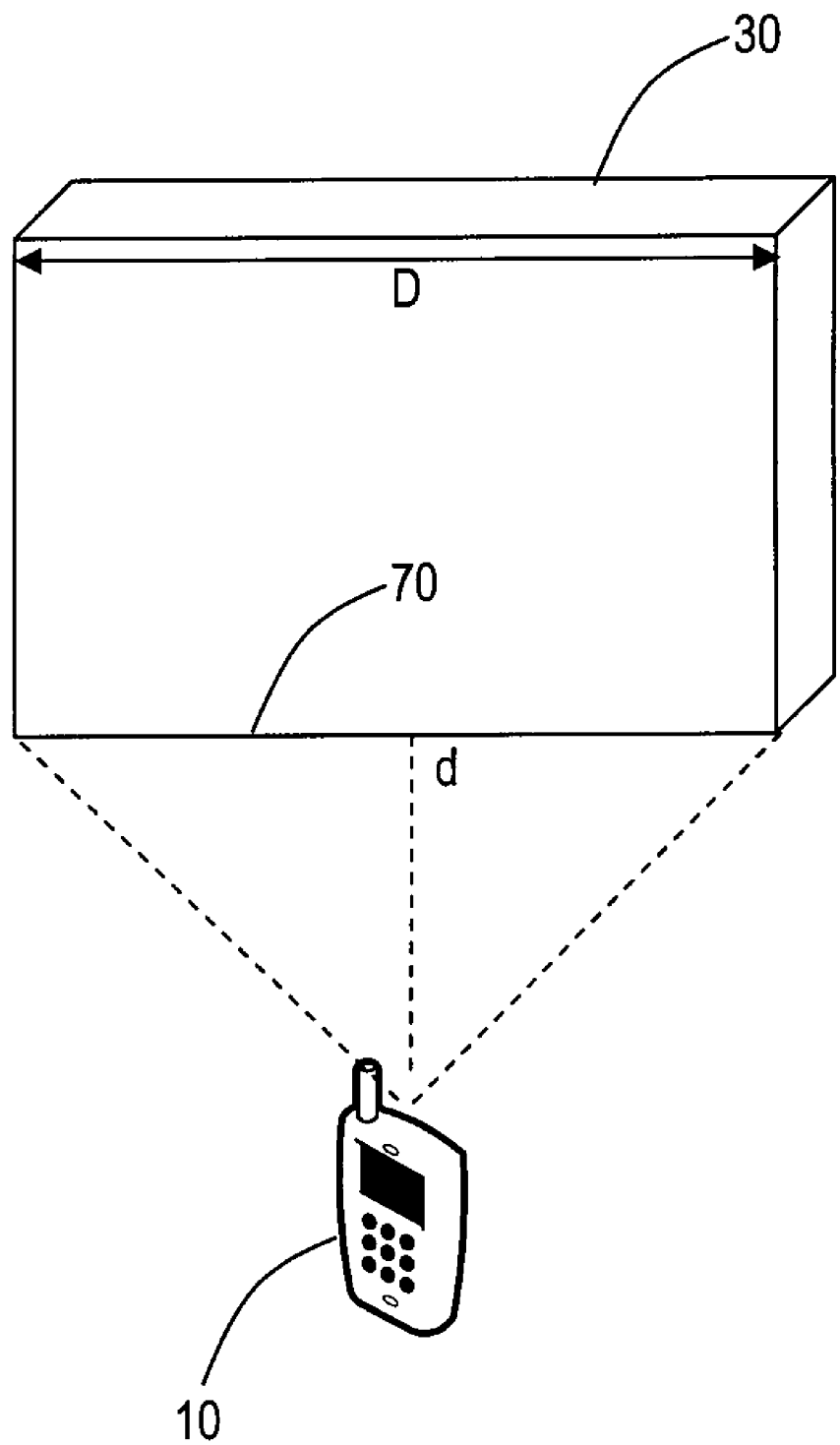
FIG. 9 is a diagram of yet another measurement operation using the mobile device for dimensioning according to an exemplary embodiment of the present invention.

Referring to FIG. 9, in another exemplary embodiment, to verify, and refine measurements, the user and/or device 10 can also measure the hypotenuse between two dimensions leveraging trigonometry techniques to validate dimensions. Here, the user can position the mobile device 10 near a center-point of an edge 70 to dimension. The user can then press a trigger or other activation mechanism on the device 10 and draw the device 10 and back at a perpendicular to the edge 70 being measured. The imager is running and looks for the two ends in its field of views (corners in a box case). Once the imager identifies the two ends (corners), the device 10 performs a distance measurement (d). As shown in FIG. 2, the computer device calculates "d", one of the legs of a right triangles and then uses trigonometric techniques to calculate half (½) of the dimension.

In other exemplary embodiments of the present invention, measured dimensions of a parcel can be combined with other relevant data. For example, in one embodiment, global positioning satellite (GPS) coordinates can be included where measurement data was taken. In another embodiment, a color image of the parcel measured is included. In yet other embodiments, address label information and/or signature of sender (captured on screen) are included along with the measured dimensions.

Figure 10:
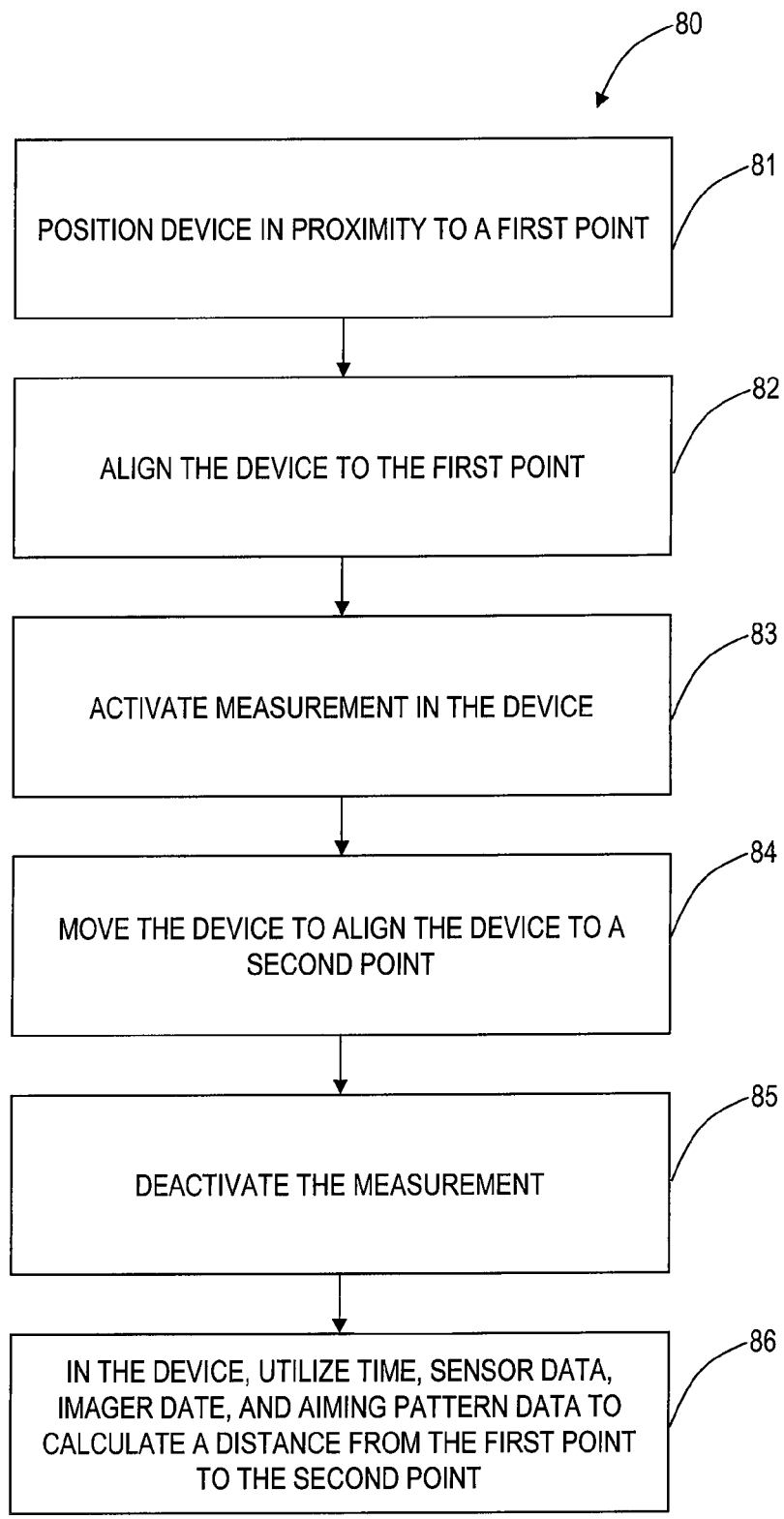
FIG. 10 is a flowchart of a measurement process utilizing a mobile device according to an exemplary embodiment of the present invention.

Referring to FIG. 10, a flowchart illustrates a measurement process 80 utilizing a mobile device according to an exemplary embodiment of the present invention. The process 80 can utilize the mobile device 10 described herein. In general, the device includes sensors, an imager, and the like. A user positions the device in proximity to a first point (step 81). The user aligns the device to the first point (step 82). This alignment can include a manual alignment (e.g. positioning a set point of the device next to the first point), lining up a laser pointer from the device with the first point, lining up an aiming pattern from the device with the first point, etc. Once aligned, the user activates measurement in the device (step 83). Here, the user can press a button, touch screen, voice command, etc. activating measurement. This can initiate a timer within the device and data collection from the sensors and the imager. At this point, the user can move the device to align the device to a second point (step 84). The device is configured to collect data from the timer, the sensors, and the imager while the device is moved to the second point. Once aligned to the second point, the measurement is deactivated (step 85). The device now utilizes all the collected time, sensor data, imager data, and aiming pattern data to calculate a distance from the first point to the second point (step 86). Specifically, the sensor data is used with the time data to compute distance. The imager data and aiming pattern data are utilized to provide offsets used to correct the sensor data for any offsets in moving the device.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A measuring method by a user of a device, comprising:
    aligning an aiming pattern of an imager in the device to a first point;
    activating a measurement control in the device upon aligning the aiming pattern to the first point;
    moving the device to align the aiming pattern to a second point;
    generating sensor data from a motion sensor in the device in response to moving the aiming pattern from the first point to the second point;
    deactivating the measurement control in the device upon aligning the aiming pattern to the second point;
    determining a distance between the first point and the second point based on the sensor data.

2. The measuring method of claim 1, wherein the distance is further based on the sensor data and image data from the imager to compensate for any movement off of a measurement axis between the first point to the second point.

3. The measuring method of claim 2, wherein the imager is configured to detect reference points and compute device orientation based on movement of the reference points.

4. The measuring method of claim 1, further comprising:
    activating a timer responsive to activating the measurement control;
    deactivating the timer responsive to deactivating the measurement control; and
    utilizing a time from the timer with the sensor data to compute the distance.

5. The measuring method of claim 4, further comprising:
    activating the imager responsive to activating the measurement control;
    monitoring any movement off of a measurement axis through the imager as the device is moved; and
    compensating for the movement off of the measurement axis.

6. The measuring method of claim 5, wherein the compensating for the movement comprises analyzing symmetry of a pattern in the imager as the device moves and analyzing distortions of the pattern as the device moves.

7. A measuring method by a device, comprising:
    providing an aiming pattern of an imager in the device on a first point;
    activating a timer in the device when the aiming pattern is on the first point;
    gathering sensor data from an accelerometer as the device moves from the first point to a second point;
    providing the aiming pattern on the second point;
    determining an elapsed time from the timer when the aiming pattern is on the second point; and
    computing distance on an axis from the first point to the second point based on the elapsed time from the timer and the sensor data from the accelerometer.

8. The measuring method of claim 7, wherein the distance is further based on the sensor data and image data from the imager to to compensate for any movement of the device off of the axis.

9. The measuring method of claim 7, wherein the imager is configured to detect reference points and compute device orientation based on movement of the reference points.

10. The measuring method of claim 7, further comprising:
    activating the imager responsive to activating the timer; and
    compensating for movement off of the axis through the imager as the device is moved.

11. The measuring method of claim 10, wherein the compensating for the movement comprises analyzing symmetry of a pattern in the imager as the device moves and analyzing distortions of the pattern as the device moves.

12. A device, comprising:
    a display for displaying a distance between a first point and a second point on a measurement axis;
    an input control for activating a measurement function of the device;
    an imager projecting an aiming pattern at the first point and the second point;
    an accelerometer for generating sensor data in response to moving the device from the first point to the second point;
    a processor for calculating the distance based on the sensor data; and
    a local interface communicatively coupling the display, the input control, the accelerometer, and the processor.

13. The device of claim 12, wherein the display comprises a user interface configured to interact with a user for performing measurements.

14. The device of claim 13, wherein the user input comprises an activation and deactivation of a measurement, and wherein the activation and deactivation sets the timer to provide a time utilized to calculate the distance with the sensor data.

15. The device of claim 13, further comprising an imager, wherein the processor is further configured to receive image frames from the imager and to compute relative movement between each of the image frames thereby determining an orientation of the device.

16. The device of claim 15, wherein the orientation is utilized by the processor to remove any sensor data not on the measurement axis between the first point and the second point.

17. The device of claim 15, wherein the processor is further configured to analyze the symmetry of the projected aiming pattern in the imager as the device moves, and wherein the symmetry and the distortions are utilized by the processor to compensate for movement off of the measurement axis through the imager as the device is moved.

18. The device of claim 17, where the aiming pattern comprises a two-dimensional pattern designed to promote detection of angular distortion when imaged, while continuing to enable targeting of objects for dimensioning, bar codes, and documents.

* * * * *

UNITED STATES PATENT AND TRADEMARK OFFICE
CERTIFICATE OF CORRECTION

PATENT NO. : 8,265,895 B2
APPLICATION NO. : 12/607144
DATED : September 11, 2012
INVENTOR(S) : Willins et al.

It is certified that error appears in the above-identified patent and that said Letters Patent is hereby corrected as shown below:

In Column 10, Line 17, in Claim 8, delete "to to" and insert -- to --, therefor.

Signed and Sealed this
Fifth Day of February, 2013

Teresa Stanek Rea
*Acting Director of the United States Patent and Trademark Office*